(12) United States Patent
Greve et al.

(10) Patent No.: US 9,814,247 B2
(45) Date of Patent: Nov. 14, 2017

(54) DEVEINING SYSTEM AND DEVICE

(71) Applicant: Laitram, L.L.C., Harahan, LA (US)

(72) Inventors: Christopher G. Greve, Covington, LA (US); Charles L. Borrello, New Orleans, LA (US); Jake R. Guillory, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/408,610

(22) Filed: Jan. 18, 2017

(65) Prior Publication Data
US 2017/0202229 A1   Jul. 20, 2017

Related U.S. Application Data

(60) Provisional application No. 62/280,860, filed on Jan. 20, 2016.

(51) Int. Cl.
*A22C 29/00* (2006.01)
*A22C 29/02* (2006.01)

(52) U.S. Cl.
CPC .................. *A22C 29/022* (2013.01)

(58) Field of Classification Search
CPC ................. A22C 29/00; A22C 29/02–29/026
USPC ......................................................... 452/1–6
See application file for complete search history.

(56) References Cited

U.S. PATENT DOCUMENTS

| | | |
|---|---|---|
| 2,684,500 A | 7/1954 | Jones et al. |
| 2,694,218 A | 11/1954 | Lapeyre et al. |
| 2,712,152 A | 7/1955 | Samanie |
| 2,825,927 A | 3/1958 | Lapeyre et al. |
| 2,828,117 A * | 3/1958 | Bruestle ............... E21C 35/18 299/112 R |
| 2,928,117 A | 3/1960 | Lapeyre et al. |
| 2,960,719 A | 11/1960 | Merrick |
| 3,031,714 A | 5/1962 | Skrmetta et al. |
| 3,143,763 A | 8/1964 | Welcker et al. |
| 3,159,871 A | 12/1964 | Jonsson |
| 3,393,424 A | 7/1968 | Welcker et al. |
| 3,414,934 A | 12/1968 | Skrmetta et al. |
| 3,430,288 A | 3/1969 | Lapeyre |
| 3,566,437 A | 3/1971 | Jonsson |
| 3,634,909 A * | 1/1972 | Matthiesen ........... A22C 29/028 452/179 |
| 3,691,592 A * | 9/1972 | Ward ..................... A22C 29/00 452/4 |
| 3,698,038 A | 10/1972 | Jones, Jr. |
| 3,703,746 A | 11/1972 | Jones, Jr. |
| 3,787,928 A | 1/1974 | Domecki |
| 3,867,740 A | 2/1975 | Lapine et al. |

(Continued)

OTHER PUBLICATIONS

Extended European Search Report of EP171516693, dated Jun. 22, 2017, European Patent Office, Munich, Germany.

*Primary Examiner* — Richard Price, Jr.
(74) *Attorney, Agent, or Firm* — Catherine M. Bishop

(57) ABSTRACT

A deveining system efficiently removes veins from shrimp while preserving the meat of the shrimp in both appearance and quantity. The deveining system comprises an endless deveining wall having outwardly-extending snagging tabs. Water flooding a deveining region creates a vacuum effect to pull exposed veins through openings formed by the snagging tabs, followed by separation of the body of the shrimp from the veins.

20 Claims, 22 Drawing Sheets

(56) References Cited

U.S. PATENT DOCUMENTS

| | | | |
|---|---|---|---|
| 3,925,848 A * | 12/1975 | Ward | A22C 29/00 452/4 |
| 3,952,371 A | 4/1976 | LaPine et al. | |
| 4,121,322 A | 10/1978 | Rutledge | |
| 4,393,543 A | 7/1983 | Martin | |
| 4,413,377 A | 11/1983 | Betts | |
| 4,414,709 A | 11/1983 | Betts | |
| 4,439,893 A | 4/1984 | Betts | |
| 4,692,965 A | 9/1987 | Stephenson | |
| 4,745,660 A | 5/1988 | Betts et al. | |
| 4,996,744 A | 3/1991 | Meyer | |
| 5,035,669 A | 7/1991 | Betts | |
| 5,195,921 A | 3/1993 | Ledet | |
| 5,290,199 A | 3/1994 | Morris | |
| 5,435,775 A | 7/1995 | Jonas | |
| 5,522,764 A | 6/1996 | Keith et al. | |
| 5,569,065 A | 10/1996 | Sawyer et al. | |
| 5,613,903 A | 3/1997 | Harris et al. | |
| 6,129,621 A | 10/2000 | Shelton | |
| 6,200,209 B1 | 3/2001 | Shelton | |
| 6,273,807 B1 | 8/2001 | Shelton | |
| 6,435,959 B1 | 8/2002 | Skrmetta | |
| 7,470,173 B2 * | 12/2008 | Morris, III | A22C 21/0061 452/173 |
| 8,177,609 B2 * | 5/2012 | Andersen | A22C 29/028 452/1 |
| 8,616,940 B2 | 12/2013 | Vedsted et al. | |
| 8,870,632 B2 | 10/2014 | Vedsted et al. | |

\* cited by examiner

US 9,814,247 B2

DEVEINING SYSTEM AND DEVICE

RELATED APPLICATIONS

This application claims priority to U.S. Provisional Patent Application Ser. No. 62/280,860, filed Jan. 20, 2016 and entitled "Deveining System and Device", the contents of which are herein incorporated by reference.

FIELD OF THE INVENTION

The present invention relates to a device for removing veins from shrimp or other crustaceans.

BACKGROUND OF THE INVENTION

In preparing shrimp, crawfish or other animals having a vein in the alimentary canal, it is often desirable to remove the vein, otherwise known as the digestive tract of the shrimp. Current options for deveining shrimp include manual removal, which is inefficient and time-consuming, and automated devices known in the art.

With manual operations, a worker must perform a number of operations to partially or entirely remove the shell from the meat of the shrimp, and cut the meat of the shrimp in a manner desirable to the end user. Manual vein removal is relatively time consuming and thus can lead to higher costs. Moreover, such prolonged contact between workers and the shrimp can lead to contamination of the shrimp. Additionally, the resulting processed product can be less than uniform depending upon the individual worker performing the operation, and the diligence with which the worker processes the shrimp.

Prior automated deveining devices may also lack efficiency, and can also damage the meat, leading to both an undesirable appearance in the shrimp and a reduced quantity of the meat. In automated deveining devices, cutting blades often tear into the meat, making many processed shrimp undesirable for presentation and—or wasting valuable meat product.

SUMMARY OF THE INVENTION

A shrimp deveining system efficiently removes veins from shrimp or other animals while preserving the meat of the shrimp in both appearance and quantity. An endless deveining wall moves through a circuit to remove veins from shrimp in a deveining region of the deveining wall.

BRIEF DESCRIPTION OF THE FIGURES

These features and aspects of the invention, as well as its advantages, are described in more detail in the following description, appended claims, and accompanying drawings, in which:

DETAILED DESCRIPTION

An improved deveining system includes an endless deveining wall that moves through a circuit to cleanly remove a vein (the digestive tract) from a shrimp or other crustacean. The invention will be described relative to certain illustrative embodiments, though those skilled in the art will recognize that the invention is not limited to the described embodiments.

Figure 1:
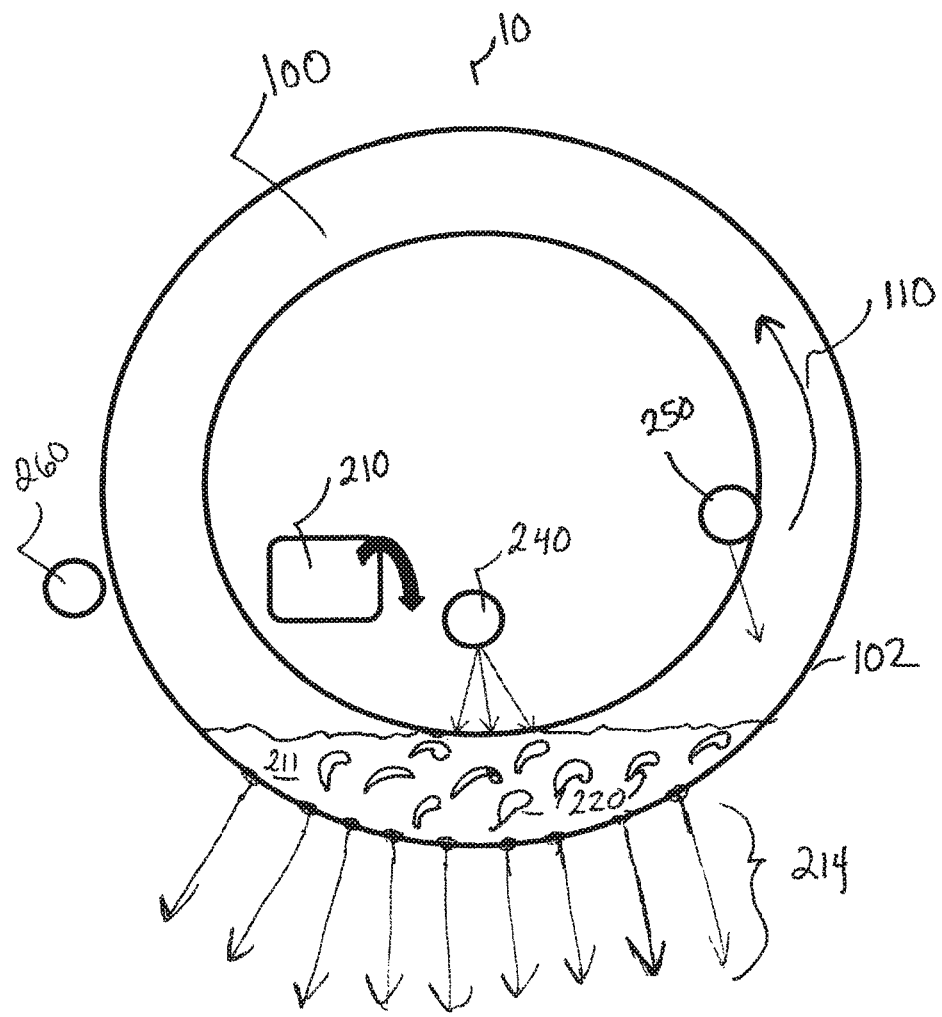
FIG. 1 is a schematic front view of a deveining system according to an embodiment of the invention.

FIG. 1 is a schematic front view of a deveining system 10 for removing the exposed veins of shrimp or other string-like components from an object. The deveining system 10 receives a batch of shrimp from a slitter or other device that slices the backside of a shrimp to expose a vein, removes any remaining veins to produce clean shrimp and passes the deveined shrimp on for further processing, if required or desired. The illustrative deveining system 10 comprises an endless deveining wall, such as a cylindrical drum, conveyor belt or other suitable device, which moves through a circuit and includes perforations for deveining a shrimp. The perforations may be formed by outwardly-extending snagging tabs. The deveining process may be facilitated by a vacuum created by water or another liquid passing through the perforations in the endless deveining wall. A helical path may guide the shrimp from the inlet to the outlet of the deveining wall.

Figure 6:
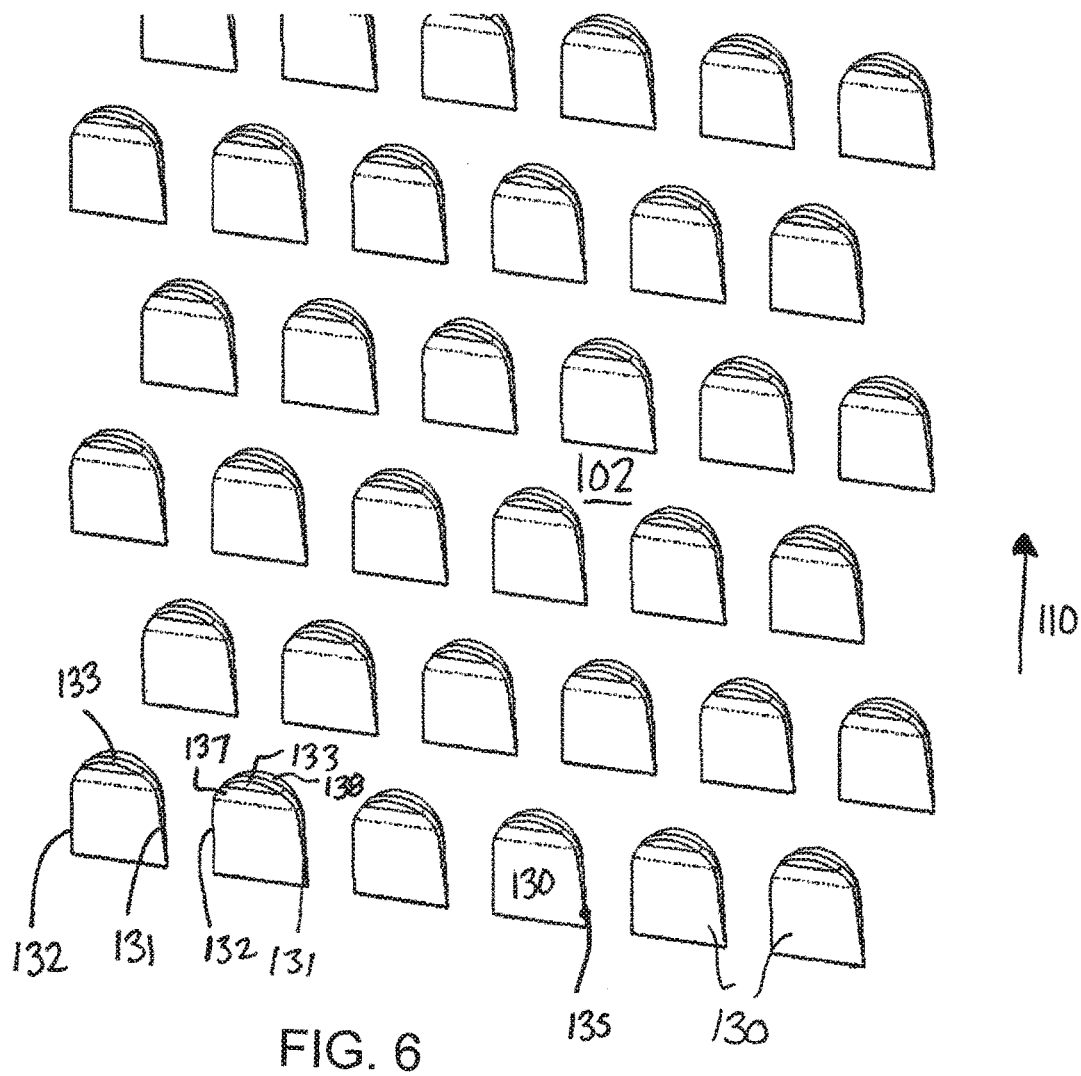
FIG. 6 is a detailed exterior view of a deveining wall including snagging tabs according to an embodiment of the invention.
Figure 7:
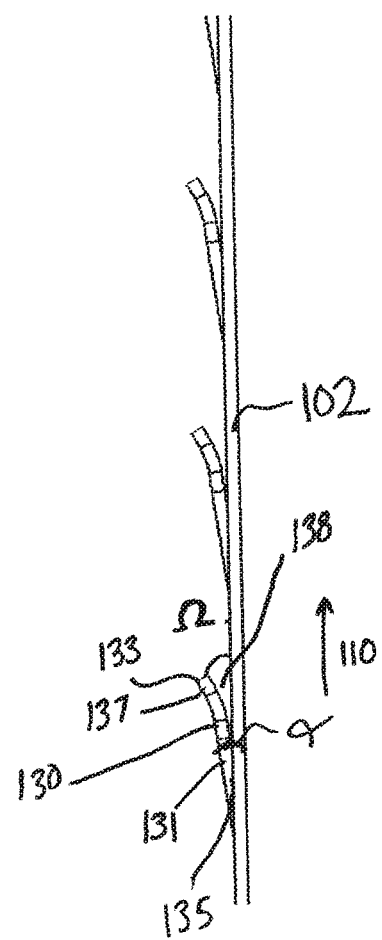
FIG. 7 is a side view of the deveining wall of FIG. 6.
Figure 8:
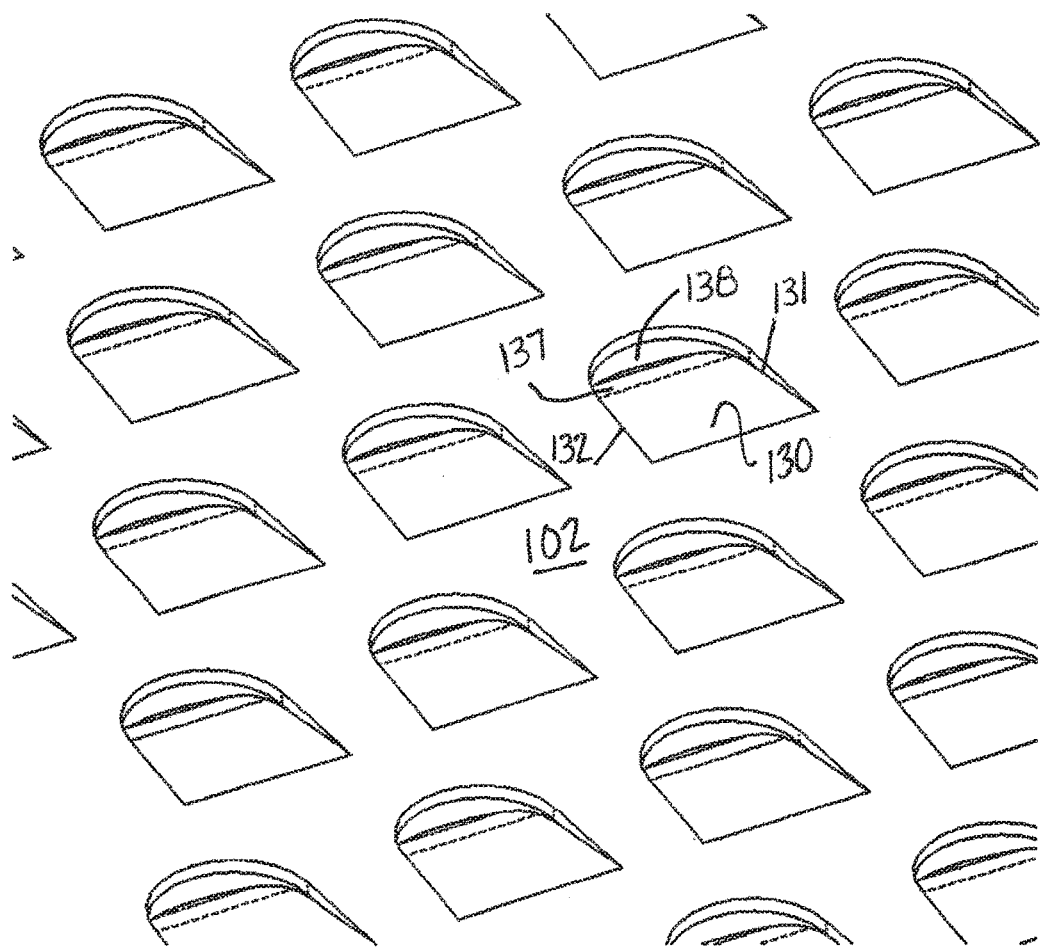
FIG. 8 is detailed interior view of the deveining wall of FIG. 6.

The illustrative tumbler 100 comprises a rotatable cylindrical drum having a deveining wall formed of sheet metal or another suitable material, forming a deveining area in the interior of the drum. The shrimp tumbler 100 includes perforations in the deveining wall 102 forming outward-facing snagging tabs (an embodiment of which is shown in FIGS. 6-8) for snagging the veins of shrimp. A flume 210 floods the bottom of the tumbler 100 with water 211 or another suitable liquid. The perforations create a vacuum effect in the tumbler as the water drains through the perforations in area 214 to pull veins from the shrimp 220 through the perforations to the outer surface of the deveining wall, catching the shrimp against the inner surface of the deveining wall. As the drum rotates in direction 110, the snagging tabs drag the caught shrimp in the direction of rotation. Gravity pulls the body of the shrimp falls back, pulling the vein in to the bottom intersection of the snagging tabs, which separates the vein from the body. An agitator 240 provides spray to facilitate the deveining process and a scraper 250 on the inside of the tumbler pushes shrimp down into the flooded water 211 to facilitate deveining.

In addition, a vein cleaner 260 on the outside of the drum 100 removes the snagged veins and other debris before the perforations are exposed to the flooded water 211 again.

Figure 2:
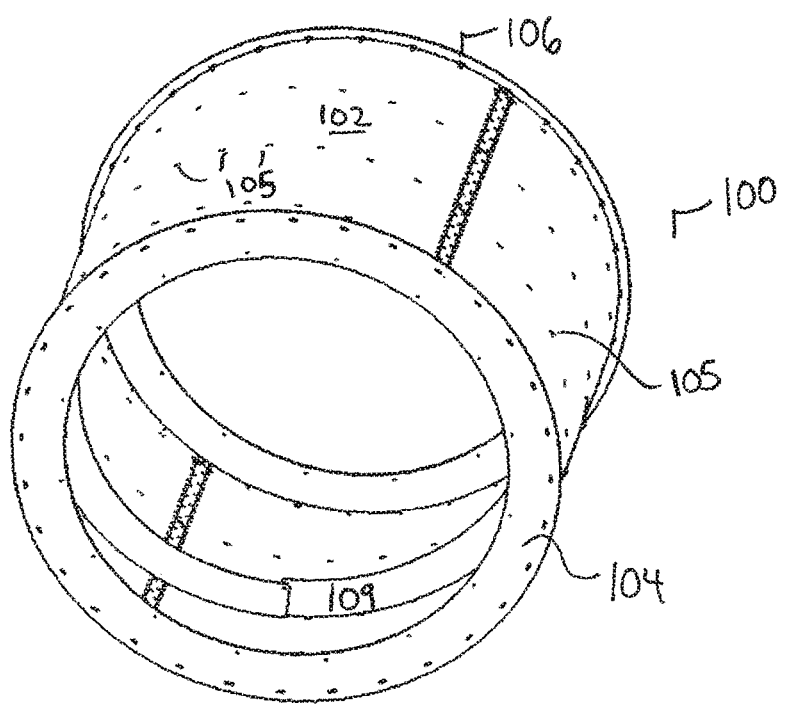
FIG. 2 is an isometric front view of an embodiment of a tumbler having an endless deveining wall according to an embodiment of the invention.

FIG. 2 shows an embodiment of a tumbler 100 suitable for use in the deveining system 10 of an embodiment of the invention. The tumbler 100 includes a cylindrical deveining wall 102 formed of sheet metal or another suitable material and wrapped to define a hollow cylinder. The deveining wall 102 includes snagging tabs or another suitable perforation for cutting a vein from a shrimp. A front ring 104 forms a lip to contain water in the bottom of the tumbler. Shrimp pass into the interior of the tumbler via the opening in the front ring 104. A rear ring 106 forms a lip for containing water and shrimp in the bottom of the tumbler. Deveined shrimp pass through the opening in the rear ring. The illustrative deveining wall 102 includes slits 105 along a helical path for receiving connecting tabs of curved sheets inside the drum to form a helix 109 for pushing the shrimp along the length of the tumbler as it turns. The helical path formed by the helix 109 provides each shrimp with multiple exposures to the snagging tabs in the deveining wall as it passes along the length of the tumbler, increasing the effectiveness of the deveining process. Any suitable means for forming an interior helix to define a shrimp path from the inlet to the outlet of the tumbler may be used, and the invention is not limited to the illustrative helix.

Figure 3:
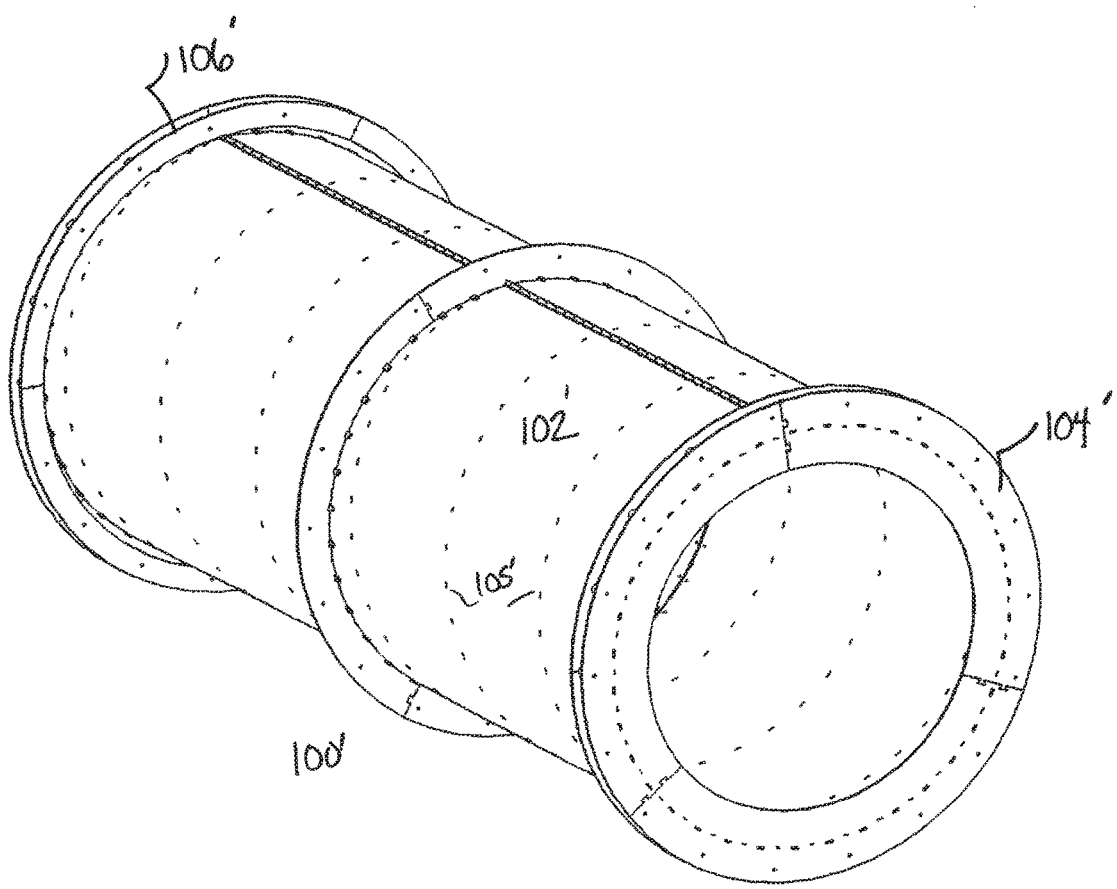
FIG. 3 is an isometric front view of another embodiment of a tumbler for deveining shrimp.
Figure 4:
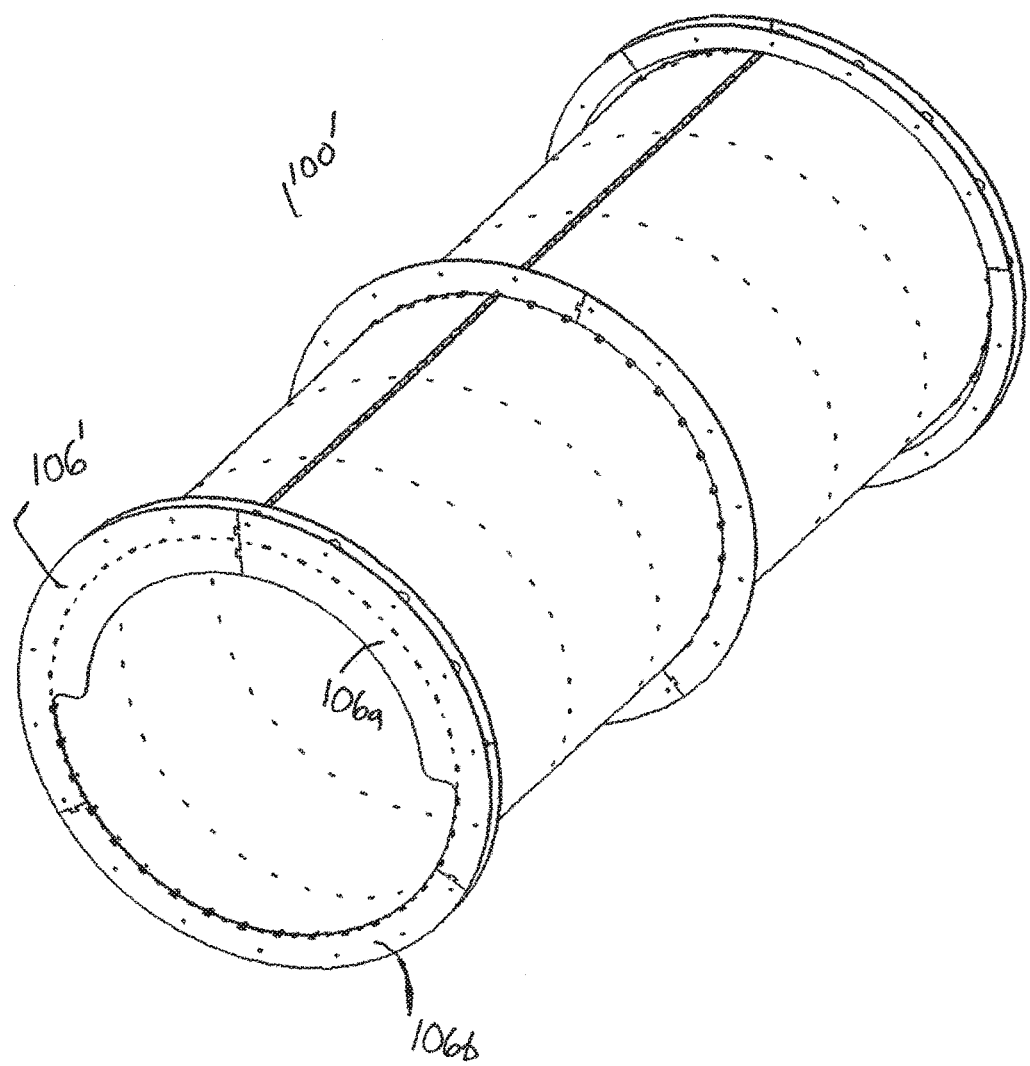
FIG. 4 is an isometric rear view of the tumbler of FIG. 3.
Figure 5:
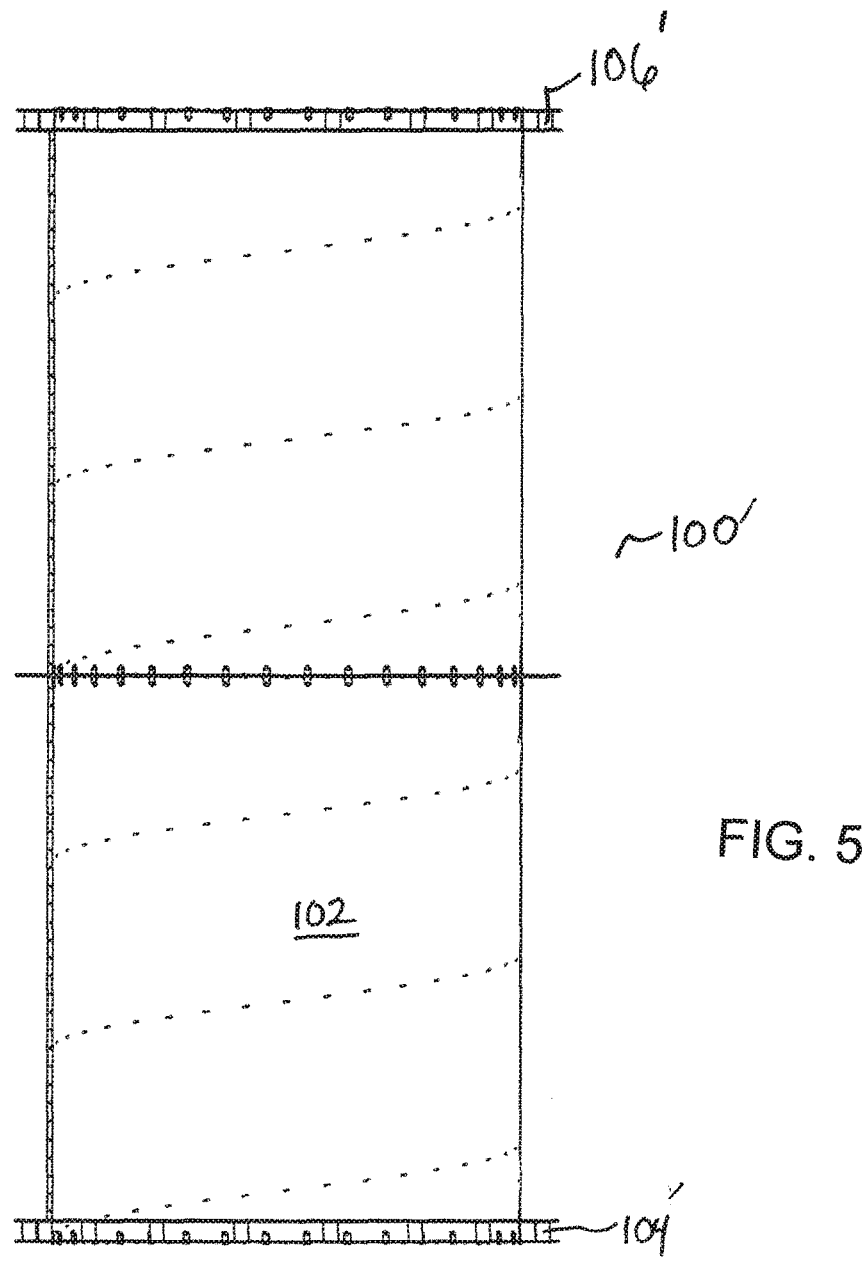
FIG. 5 is a top view of the tumbler of FIG. 3.

As shown in FIGS. 3-5, a tumbler 100' can comprise multiple sections joined in series to form an elongated drum with a front ring 104', rear ring 106', cylindrical deveining wall 102', the interior of which forms a deveining area, and helically arranged slits 105'. The rear ring 106' can have a thicker section 106a and a thinner section 106b to ensure containment of the deveined shrimp for an extra half-turn of the tumbler 100' before exiting.

FIGS. 6-8 are detailed views of a portion of a deveining wall 102 of a tumbler 100, showing an embodiment of the outward-facing snagging tabs 130 for snagging the veins of shrimp passing through the tumbler. The tabs 130 are formed by punching or stamping the sheet metal forming the deveining wall 102, or through another suitable means known in the art. The tabs 130 point in the direction of rotation 110 of the deveining wall 102. Each tab 130 comprises straight side edges 131, 132 and a rounded tip edge 133. The straight side edges 131, 132 extend out from the wall 102 at an angle α that is between about 6° and about 10° and preferably about 8° to form a tapering groove terminating in a sharp point 135 at the intersection between the base wall 102 and the tab 130. It is this sharp point 135 that snags and removes a vein protruding through the groove. In the illustrative embodiment, the rounded end 137 formed by the rounded tip edge 133 is bent farther outwards to form a larger opening 138 at the tip of the snagging tab 130, allowing larger veins to pass from inside the drum to the outside, while preventing the body of the shrimp from passing therethrough. The enlarged opening 138 also increases the vacuum effect caused by the cascade of water over the shrimp from the flume that passes through the openings 138. In one embodiment, the bent tip 133 extends at an angle Ω of between about 20° and about 35° and preferably about 28° relative to the sheet metal 102. During operation of the deveining system, the flume 210 and water agitator 240 flood the bottom of the tumbler 100 to create pool 211, with the end rings 104, 106 containing the shrimp and water in the bottom of the drum. The water passes through the openings 138 formed by the tabs 130 into area 214, creating a vacuum that pulls the veins through the openings 138 as well. As the drum 100 rotates in direction 110, the snagging tabs 130 pull the caught shrimp, and the veins slide into the tapering groove between the side edges 131, 132 and the deveining wall 102, eventually snapping the veins from the body of the shrimp. The deveined body of the shrimp remains within the drum, following the helical path defined by the helix 109 within the drum. The deveined shrimp pass from the drum via the rear ring 106 and onto a chute, conveyor or other device for recovering the deveined shrimp.

Figure 9:
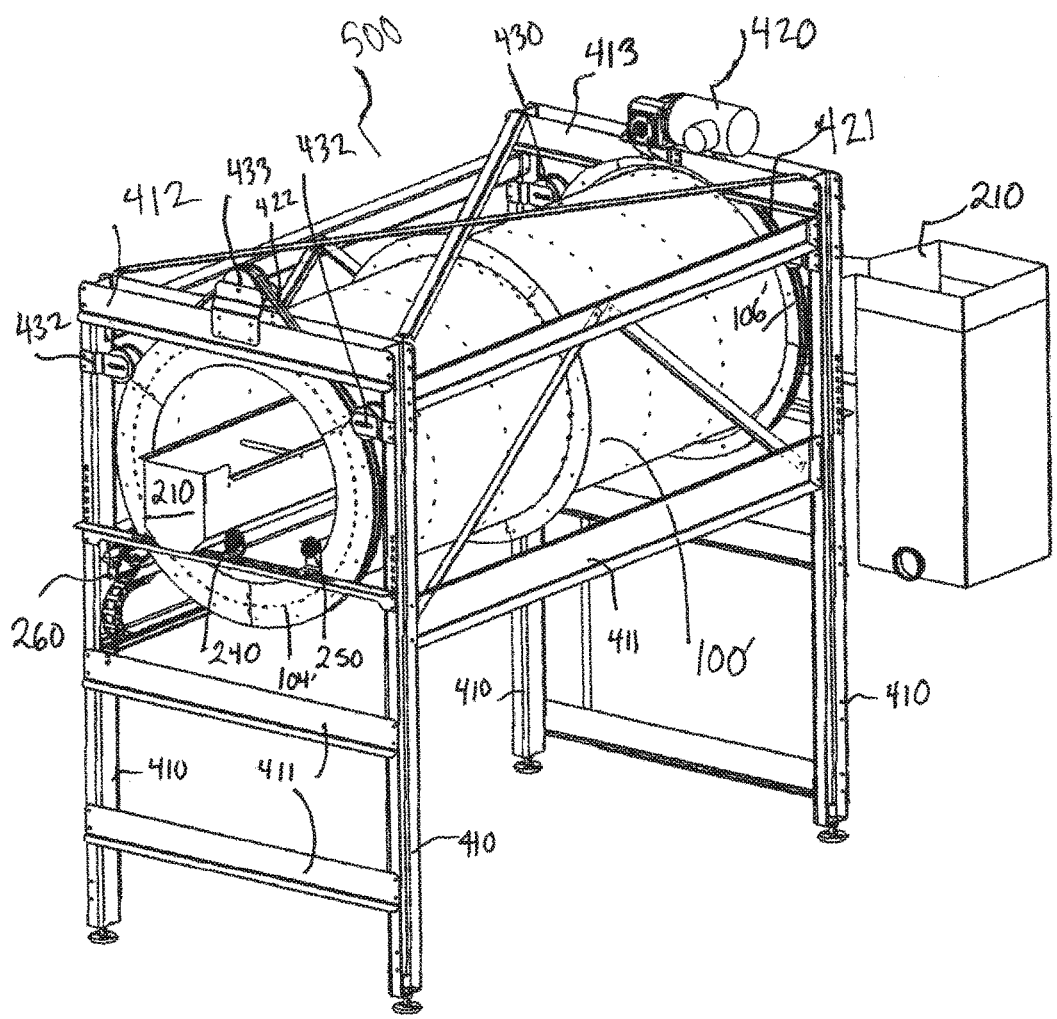
FIG. 9 is an isometric front view of a deveining system employing the tumbler of FIG. 3.
Figure 10:
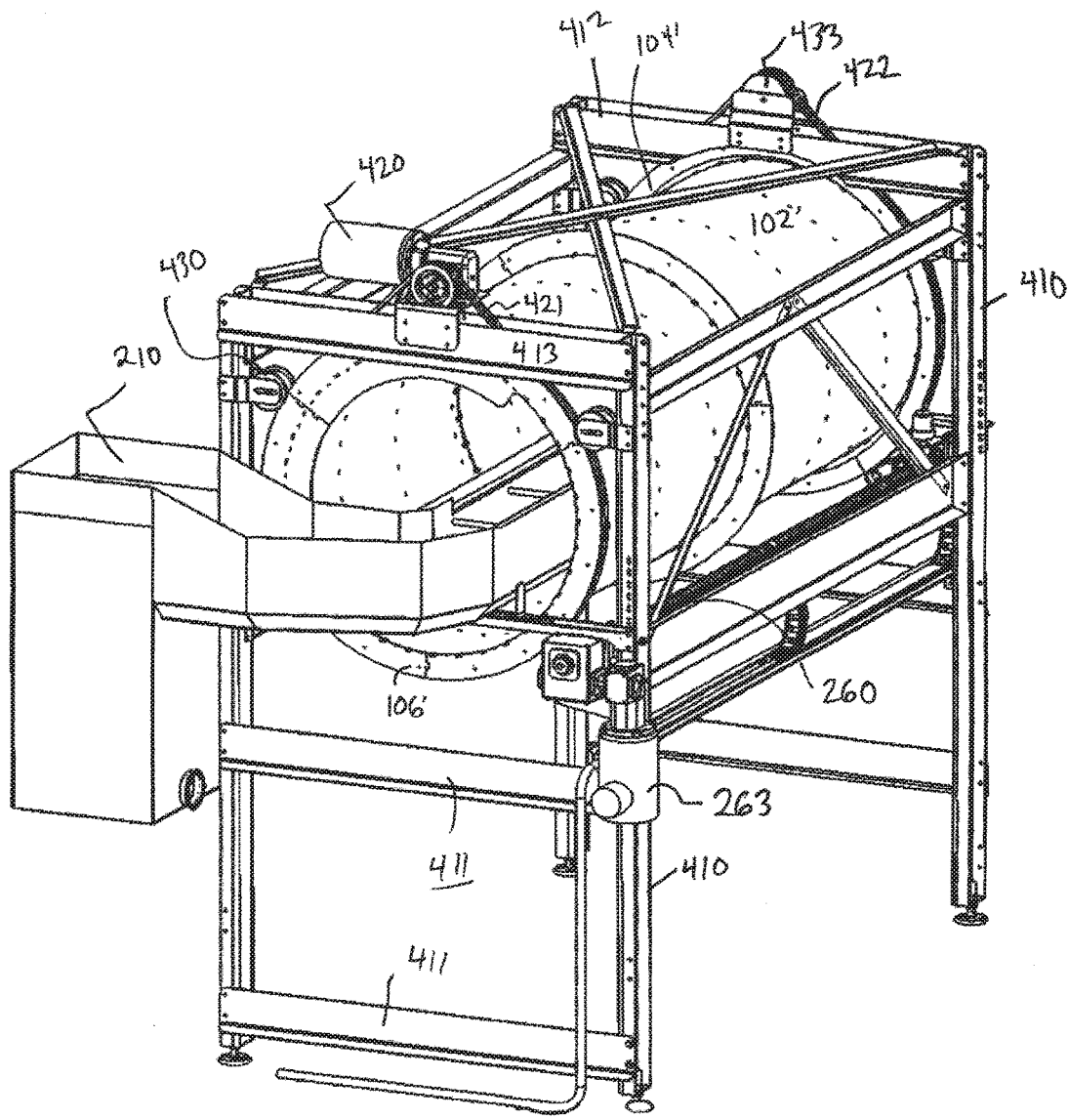
FIG. 10 is an isometric rear view of the deveining system of FIG. 9.

FIG. 9 is an isometric front view of a deveining system 500 including a frame 400 for mounting a rotating tumbler 100' according to an embodiment of the invention. FIG. 10 is an isometric rear view of the deveining system 500. The illustrative frame 400 comprises four legs 410 and a number of support beams 411, 412, 413 for rotatably mounting the tumbler 100'. A motor 420 is mounted atop a rear support beam 413 and imparts rotary motion to the tumbler 100' through belts 421 that extend around the perimeter of the rear ring 106'. The rotation speed imparted by the motor can be varied according to the particular application. Guide rollers 430 hold the edges of the rear ring 106' in place. At the front end, guide rollers 432, 433 connected to the legs 410 and top support beam 412 support the front ring 104', which is also bounded by a belt 422 that extends around the upper guide roller 433.

A flume 210 provides water to facilitate deveining. The flume enters the interior of the tumbler via the rear ring 106' and extends down the length of the tumbler 100' until the front ring 104' to cascade water along the length of the tumbler. The agitator 240 and scraper 250 comprise manifolds extending along the length of the tumbler 100'. A cleaner 260 is disposed outside the tumbler 100' for removing detached veins and other debris before the tumbler rotates through the flood of water provided by the flume 210.

In one embodiment, the deveining system 500' further includes a tank (not shown) below the tumbler 100' for receiving water that passes through perforations in the deveining wall, such as those formed by the snagging tab 130, as described above. The water can be recycled through a water recovery system.

Figure 11:
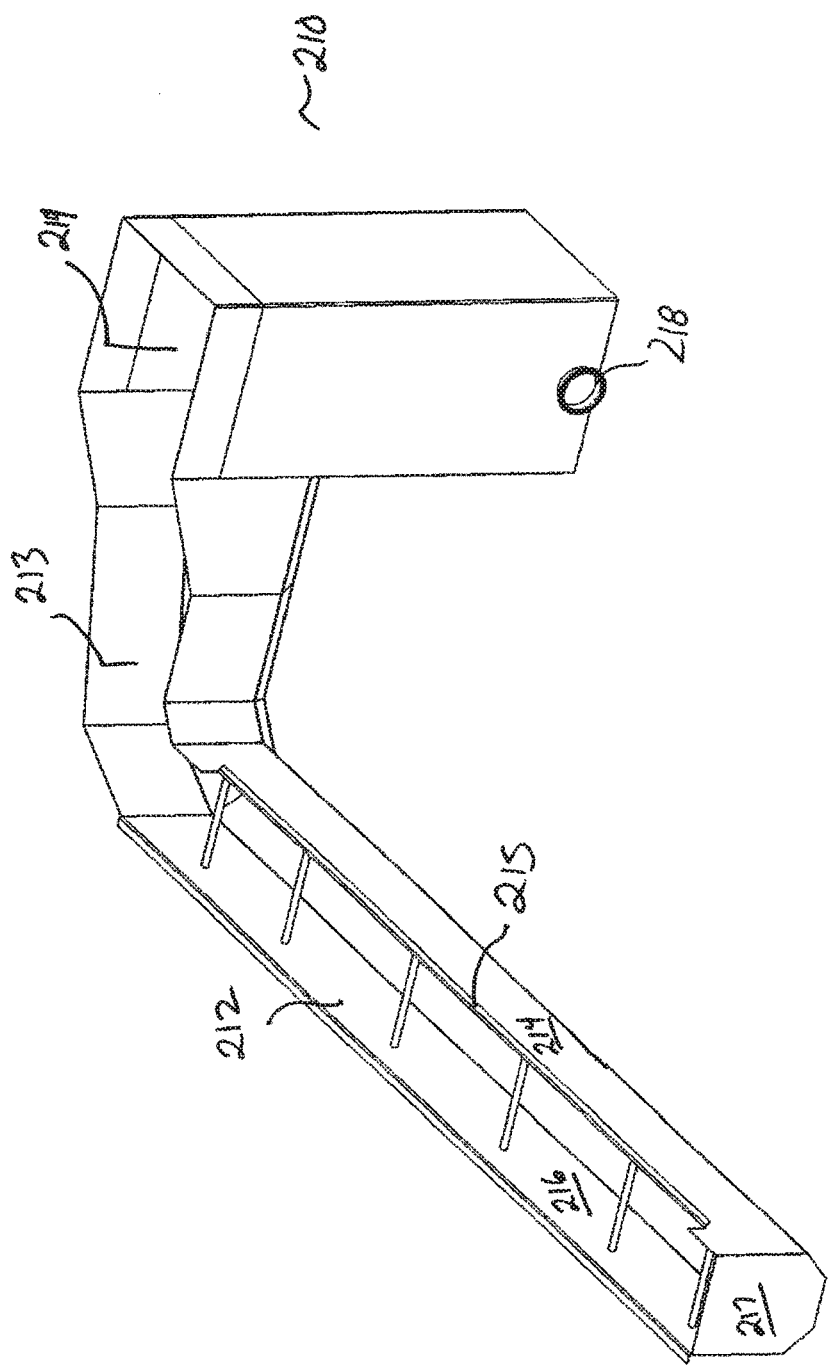
FIG. 11 is an isometric view of the flume of the deveining system of FIG. 9.

FIG. 11 shows an embodiment of a flume 210 for a deveining system of an embodiment of the invention. The illustrative flume 210 floods the bottom of a tumbler with water at a rate of between about 500 and about 600 gallons per minute, though the invention is not so limited. The flume 210 comprises an inlet tank 219 that is disposed outside of the drum 100', a gutter 212 that extends the length of the interior of the drum 100' and a connecting chute 213 between the tank 219 and gutter 212. The gutter 212 has an outer side wall 216 and an inner side wall 214 that is lower than the outer side wall, or has openings to allow water to flow therethrough. The illustrative inner side wall 214 has a lower upper edge forming a lip 215 for dumping water into the drum interior. The gutter 212 has an enclosed end formed by an end wall 217, forcing all water over the lip 215. The inlet tank 219 can receive water via inlet 218 that has been recovered from the deveiner and processed. The gutter 212 is off-center within the drum, though the position and orientation are variable.

Figure 12:
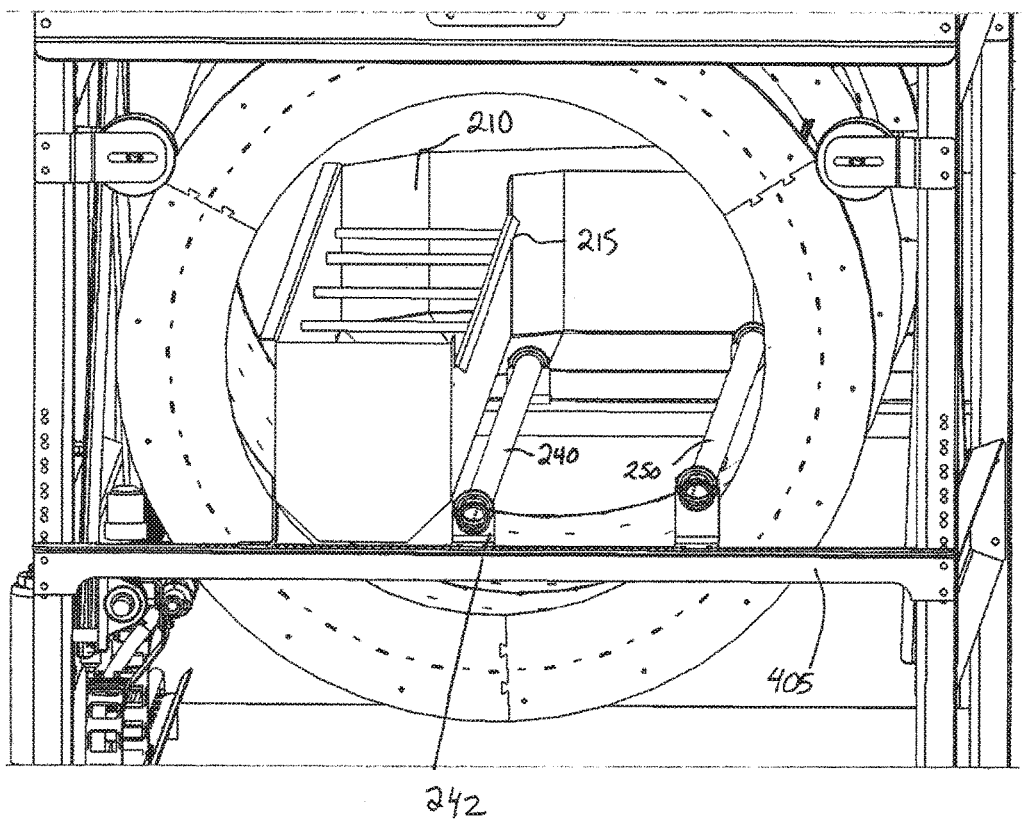
FIG. 12 is a front view of a portion of the deveining system of FIG. 9.

As shown in FIG. 12, the water agitator 240 comprises a pipe with spray openings extending the length of the drum and located below the lip 215 of the flume 210. The water agitator 240 sprays the flooded zone 211 created by the flume 210 to agitate the shrimp and facilitate separation of the veins and bodies. The pipe of the water agitator 240 is mounted to a beam 405 of the frame 400 using any suitable connector 242.

Figure 13:
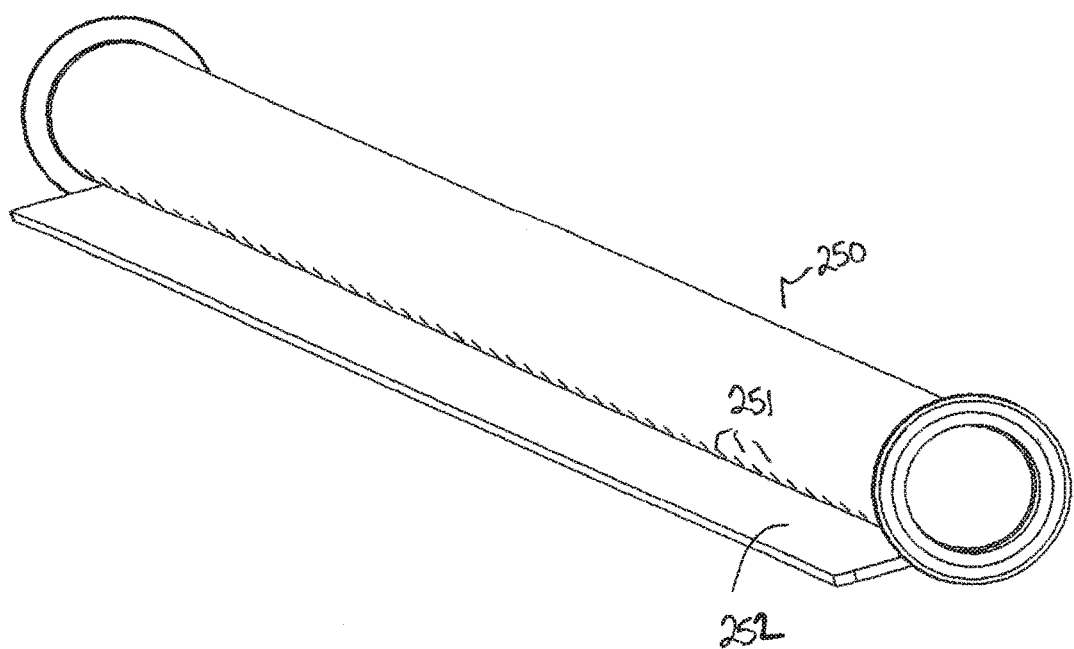
FIG. 13 is an isometric view of a scraper suitable for use with the deveining system of FIG. 9.

The scraper 250, an embodiment of which is shown in FIG. 13, also comprises a pipe with spray openings 251 and extends the length of the drum at about 135° from the top, though the position is not limited to the one shown. The scraper 250 also includes a planar edge portion 252 extending from the pipe for pushing the shrimp pulled by the rotating drum down, to facilitate removal of the trapped vein from the body of the shrimp.

Figure 14:
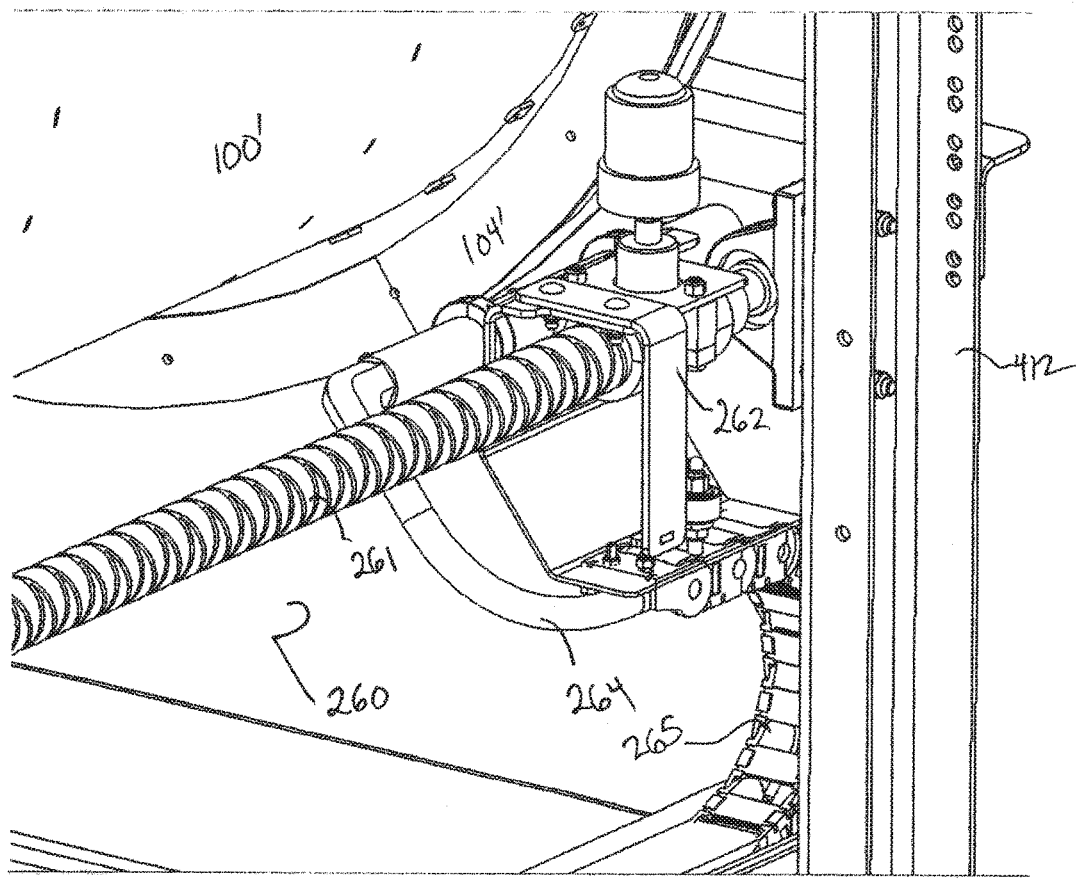
FIG. 14 is a detailed exterior view of a portion of the deveining system of FIG. 9, showing a vein cleaner according to an embodiment of the invention.

Referring to FIG. 14, the illustrative vein cleaner 260 comprises a grooved shaft 261 extending along the outside of the drum at about 225° from the top, though the invention is not so limited. A carriage 262 having spray nozzles for cleaning the outside of the drum is mounted to the grooved shaft 261. A motor 263 (shown in FIG. 10) selectively rotates the grooved shaft 261 to cause the carriage 262, which rides in the grooves of the grooved shaft, to move back and forth along the length of the grooved shaft. A high pressure hose 264 supplies cleaning liquid, such as water, to the spray nozzles. A cable tray 265 houses the hose 264 to allow the hose 264 to move back and forth with the carriage 262. The vein cleaner 260 directs the high pressure spray to the outside surface of the drum to remove snagged veins and other debris.

Figure 15:
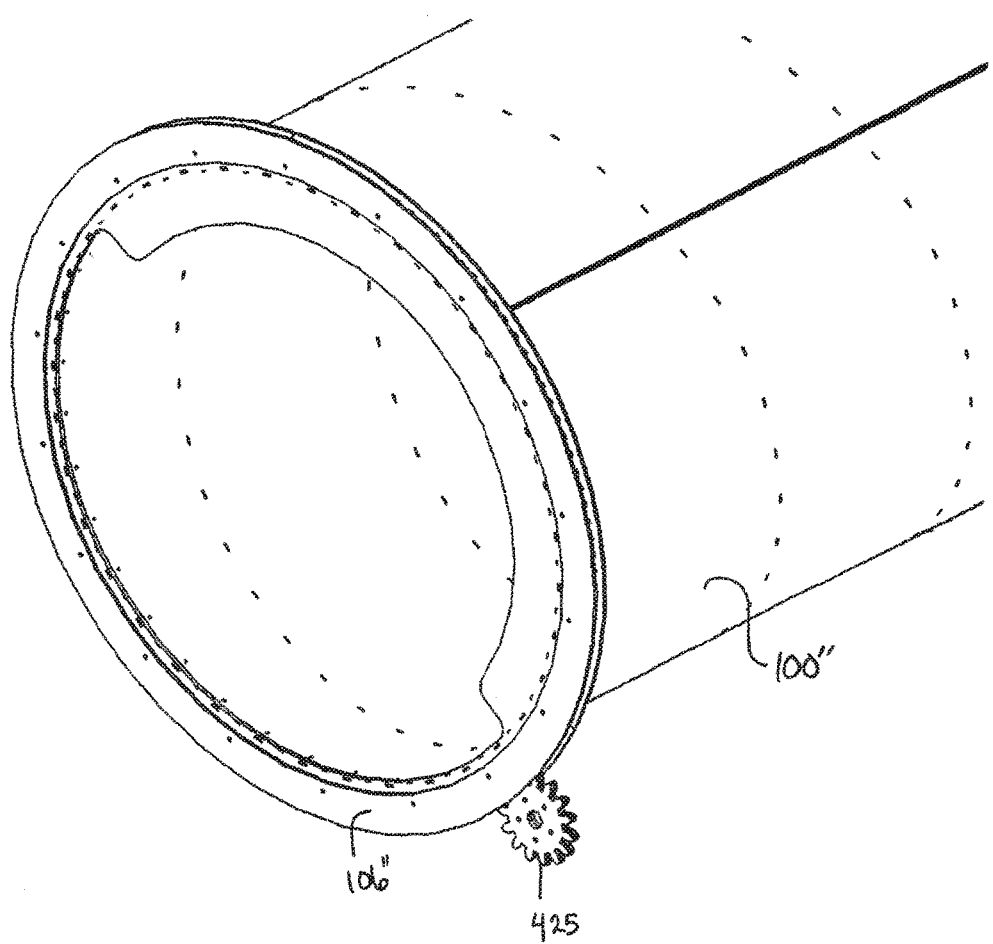
FIG. 15 shows an embodiment of a deveining drum driven by gears.
Figure 16:
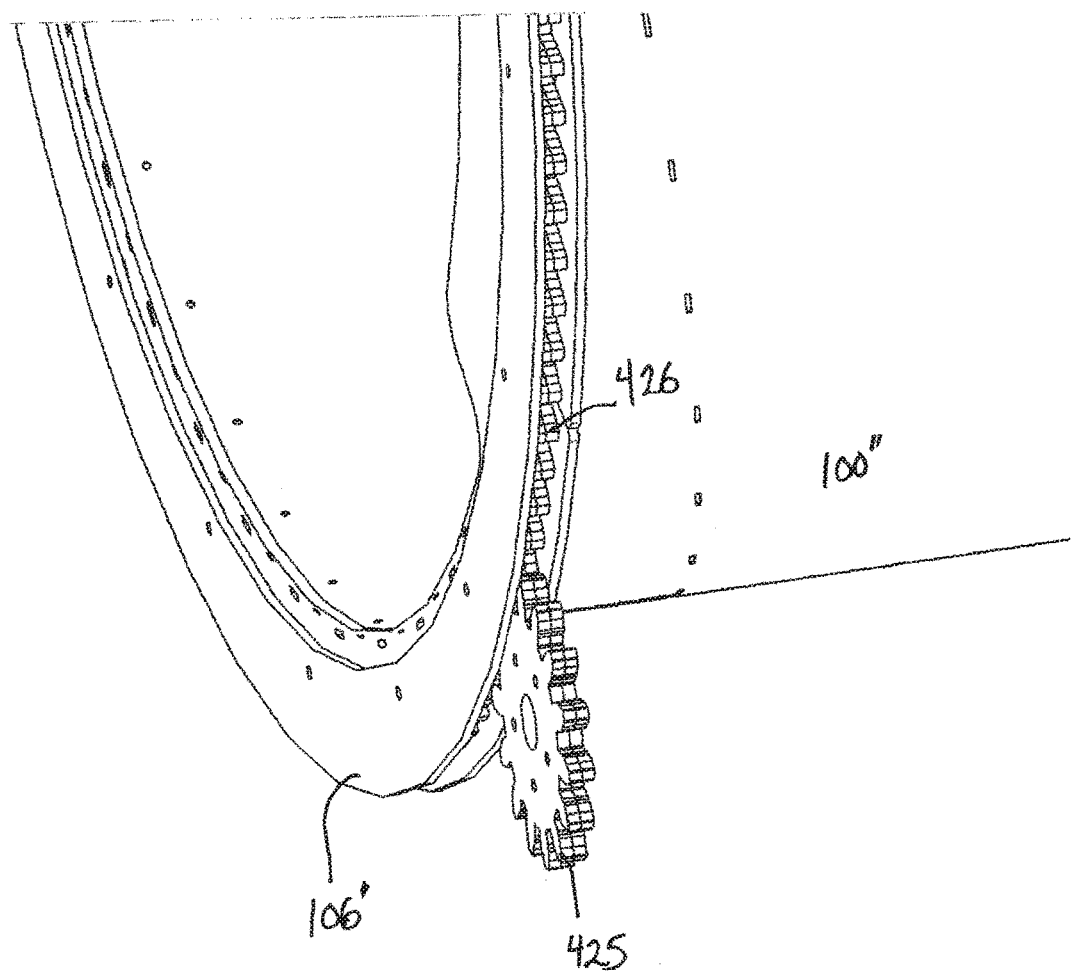
FIG. 16 is a detailed view of the gear portion of the deveining drum of FIG. 15.

While an illustrative embodiment employs belts to transfer motion to a deveining drum from a motor, the invention is not so limited, and any suitable means for rotating the drum or another endless deveining wall may be used. For example, as shown in FIGS. 15 and 16, a tumbler 100" comprising a rotating drum formed by a deveining wall may include a rotatable gear 425 that engages peripheral teeth 426 on a portion of the drum, shown as the rear ring 106''' to impart motion to the drum.

Figure 17:
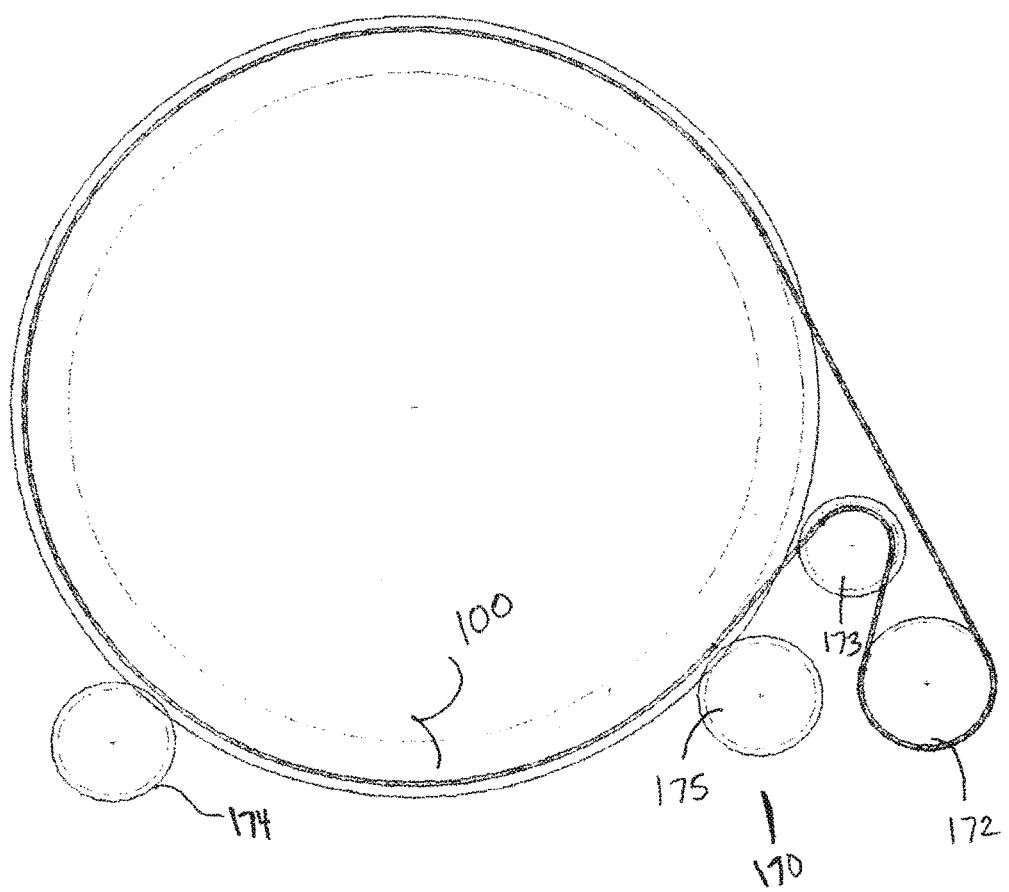
FIG. 17 is a front view of a deveining drum including a serpentine belt drive according to another embodiment of the invention.

In another embodiment, shown in FIG. 17, a serpentine belt drive is used to rotate a deveining drum 100. The serpentine belt drive 170 comprises a belt 171 trained around a peripheral edge of a drum ring and rollers 172, 173 for guiding the belt 171. Additional rollers 174, 175 hold the belt 171 in place along the periphery of the drum ring. Any suitable means for driving an endless deveining wall to devein shrimp may be used.

Figure 18:
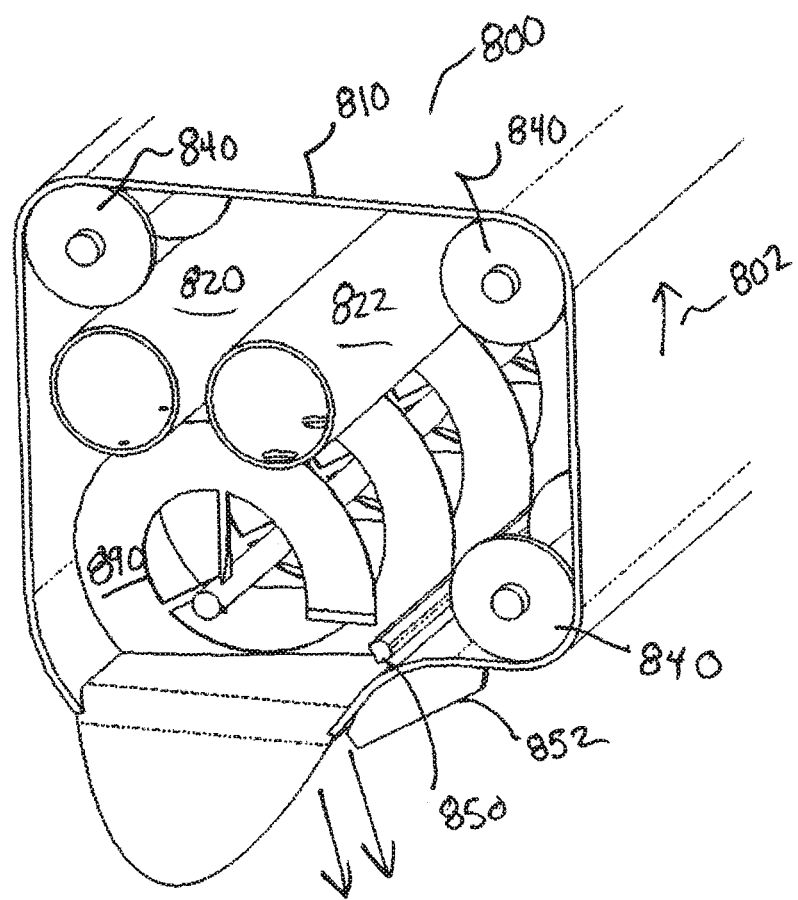
FIG. 18 shows a front portion of a deveining system including a conveyer belt forming an endless deveining wall according to an embodiment of the invention.
Figure 19:
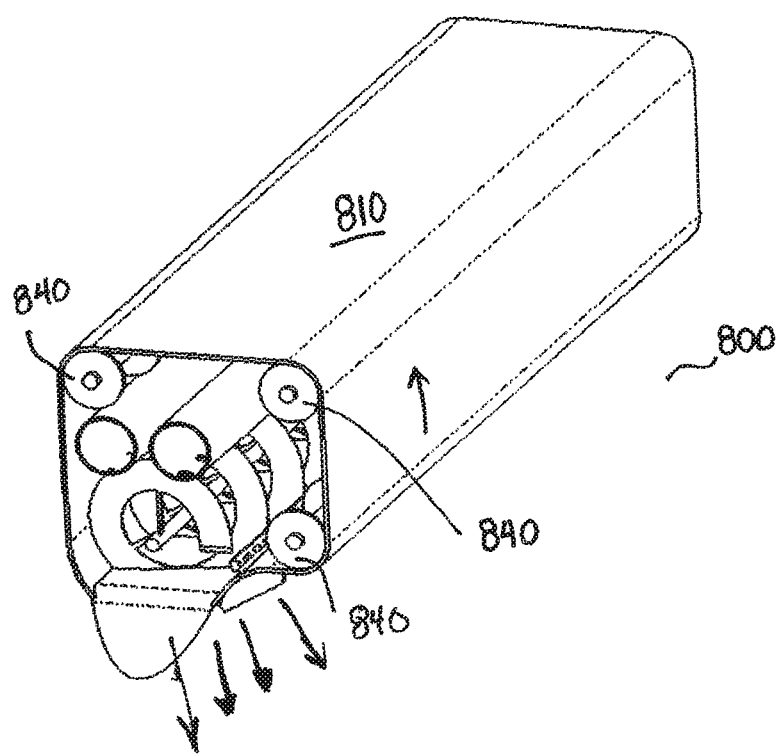
FIG. 19 is an isometric view of the deveining system of FIG. 18.
Figure 20:
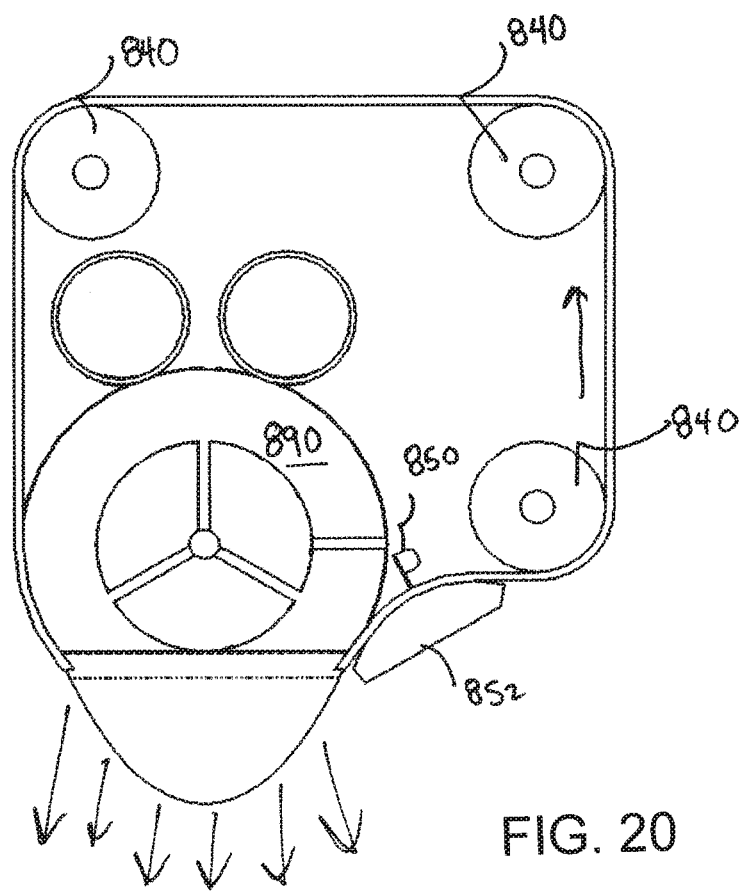
FIG. 20 is a front view of the deveining system of FIG. 18.

In addition, the invention is not limited to a cylindrical drum as a tumbler. For example, as shown in FIGS. 18-20, a deveining wall of a deveining system 800 can comprise a conveyor belt 810 trained around rollers 840 and a shoe 852 to form a deveining region within the belt circuit. A helix 890 within the conveyor belt 810 forms a helical path through the deveining region. Pipes 820, 822 dump or spray water in the deveining region to flood shrimp passing along the helical path. The conveyor belt 810 may include snagging tabs extending outwards from the outer surface of the conveyor belt 810 to snag and remove veins from shrimp passing along the helical path or other suitable means for snagging a vein from the body of a shrimp.

Figure 21:
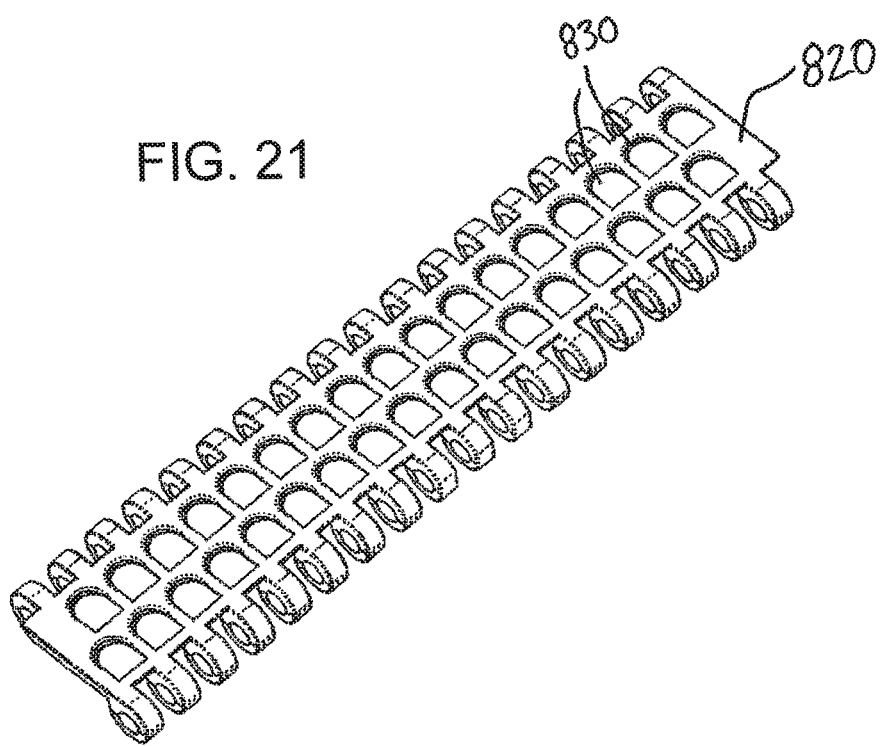
FIG. 21 is an isometric top view of a conveyor belt module including snagging tabs suitable for forming an endless deveining wall according to an embodiment of the invention.
Figure 22:
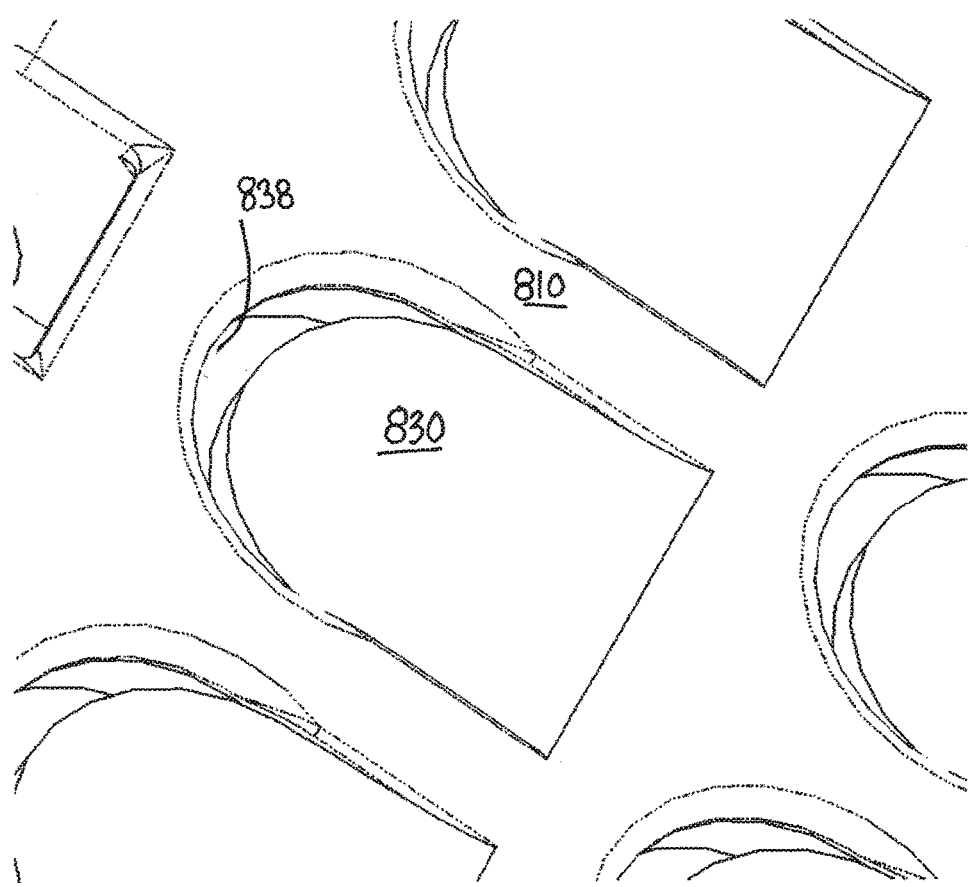
FIG. 22 is a detailed view of the snagging tabs of the conveyor belt module of FIG. 21.

For example, the conveyor belt 810 may comprise a plurality of hingedly connected modules 820 having snagging tabs 830, shown in FIGS. 21 and 22, to form a deveining wall. The snagging tabs 830 are similar to the snagging tabs 130 described above, and form openings 838 through which water dumped in the bottom of the deveining region within the conveyor belt 810 passes, creating a vacuum effect that pulls the shrimp veins through the openings 838. As the conveyor belt 810 pulls the caught shrimp along the direction of belt travel 802, the shrimp hit a scraper 850, causing separation of the vein from the body of the shrimp. A cleaner on the outside of the belt may remove the snagged veins from the tabs and clean the conveyor belt 810.

Although the invention has been described in detail with reference to a few exemplary versions, other versions are possible. So, as these few examples suggest, the scope of the claims is not meant to be limited to the versions described in detail.

What is claimed is:

1. A shrimp deveining system comprising:
    an endless deveining wall having an inner surface, an outer surface and a plurality of outward-facing snagging tabs that extend outwards at an angle from the outer surface;
    a deveining region within the deveining wall having an inlet and an outlet; and
    a drive for moving the deveining wall through a circuit to effect deveining of a shrimp by snagging the vein on a snagging tab.

2. The shrimp deveining system of claim 1, wherein the deveining wall comprises a cylindrical rotatable drum formed of sheet metal.

3. The shrimp deveining system of claim 2, further comprising front and rear rings on the cylindrical drum to form lips for defining the deveining region.

4. The shrimp deveining system of claim 1, wherein the deveining wall comprises a conveyor belt trained around rollers.

5. The shrimp deveining system of claim 1, further comprising a flume extending through the deveining region to flood the deveining region with water.

6. The shrimp deveining system of claim 5, further comprising a water agitator for agitating the water in the deveining region.

7. The shrimp deveining system of claim 1, further comprising a scraper for pushing a shrimp body away from the inner surface.

8. The shrimp deveining system of claim 1, further comprising a vein cleaner adjacent the outer surface for cleaning the outer surface.

9. The shrimp deveining system of claim 1, further comprising a helix adjacent to the interior surface of the deveining wall to define a helical path along the inner surface to guide the shrimp from the inlet to the outlet.

10. The shrimp deveining system of claim 1, wherein a snagging tab comprises a straight body extending at a first angle relative to the outer surface and a rounded tip.

11. The shrimp deveining system of claim 10, wherein the rounded tip extends at a second angle larger than the first angle relative to the outer surface to form an opening between the inner surface and the outer surface.

12. A shrimp deveining device, comprising:
    an endless deveining wall moving through a circuit and having an inner surface, an outer surface and a plurality of snagging tabs for snagging the veins of shrimp, the endless deveining wall having an inlet for shrimp on a first end and an outlet for shrimp on a second end; and slits arranged along a helical path in the endless deveining wall from the inlet to the outlet; and at least one curved sheet having connecting tabs inserted in the slits to form a helix adjacent the inner surface defining a helical path along the inner surface to guide shrimp from the inlet to the outlet.

13. The shrimp deveining device of claim 12, wherein the snagging tabs extend outward from the outer surface.

14. The shrimp deveining device of claim 12, further comprising a drive for moving the endless deveining wall through the circuit.

15. The shrimp deveining device of claim 12, further comprising a flume for flooding a bottom region of the helical path to create a vacuum effect pulling the shrimp against the snagging tabs.

16. A shrimp deveining device, comprising:
an endless deveining wall moving through a circuit and having an inner surface and an outer surface; and
a plurality of snagging tabs on the deveining wall, each snagging tabs comprising a straight body extending at a first angle relative to the outer surface and a bent tip extending at a second angle that is larger than the first angle to form an opening between the inner surface and the outer surface for passing a vein.

17. The shrimp deveining device of claim 16, wherein the bent tip has a rounded outer edge.

18. A shrimp deveining device comprising:
an endless deveining wall that moves through a circuit, the deveining wall having an inner surface and an outer surface;
a plurality of perforations in the deveining wall;
a flume for flooding a bottom region of the circuit to create a vacuum effect that pulls a vein of a shrimp through a perforation while trapping the body of the shrimp against the inner surface; and
a scraper above the bottom portion of the circuit for pushing a shrimp towards the bottom portion to sever the vein.

19. The shrimp deveining device of claim 18, wherein the perforations are formed by snagging tabs formed by punching or stamping the deveining wall.

20. A shrimp deveining device comprising:
an endless deveining wall that moves through a circuit, the deveining wall having an inner surface and an outer surface;
a plurality of perforations in the deveining wall;
a flume for flooding a bottom region of the circuit to create a vacuum effect that pulls a vein of a shrimp through a perforation while trapping the body of the shrimp against the inner surface; and
a vein cleaner adjacent the outer surface for cleaning the outer surface.

* * * * *